(No Model.)
A. G. SMITH.
APPARATUS FOR HEATING AND DRYING.
No. 245,980. Patented Aug. 23, 1881.
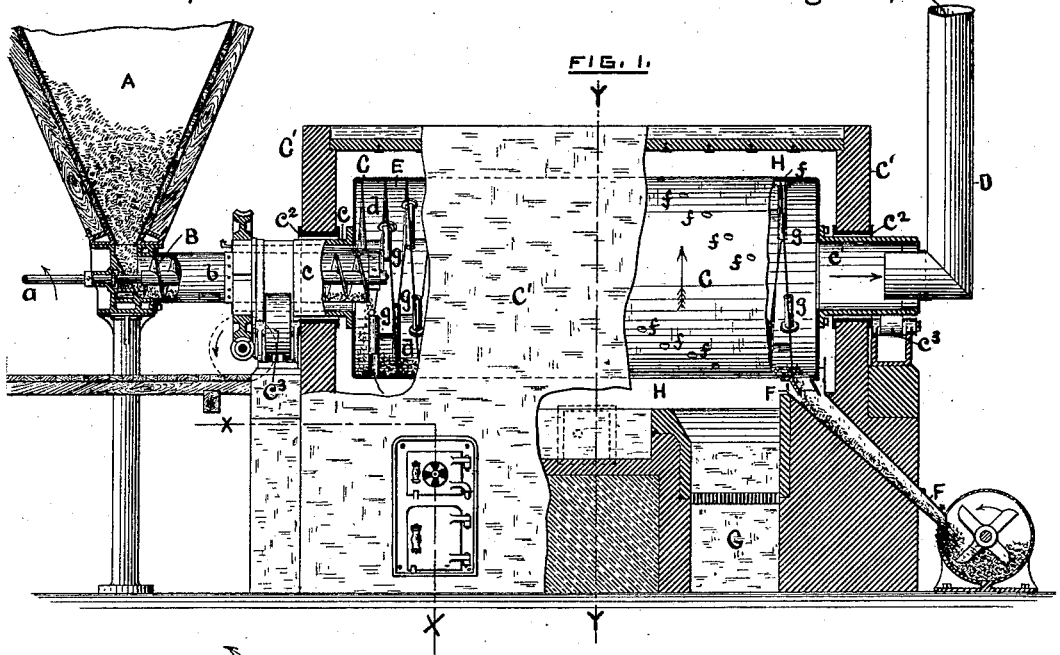
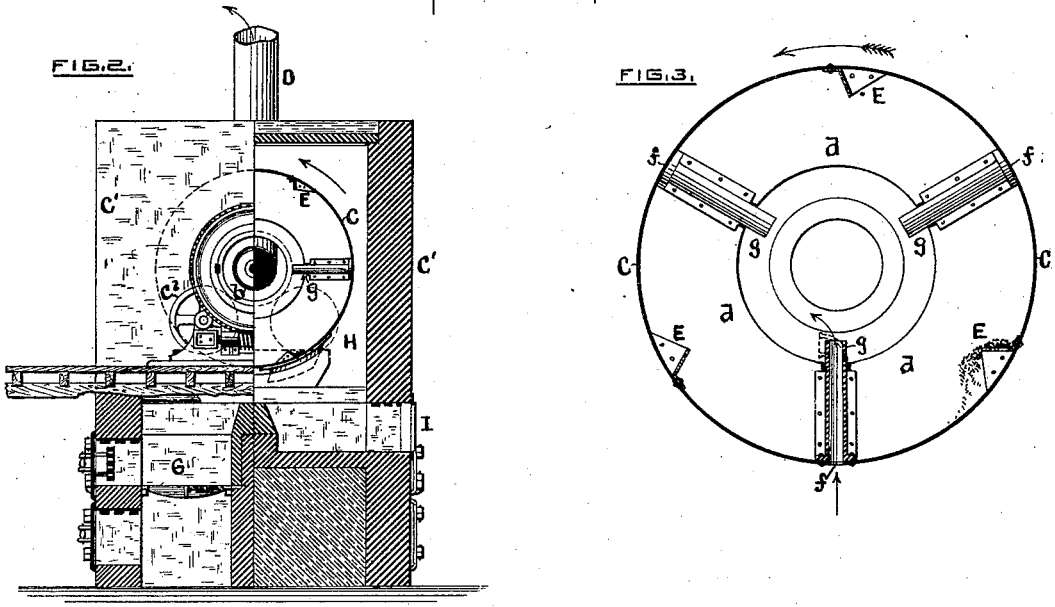
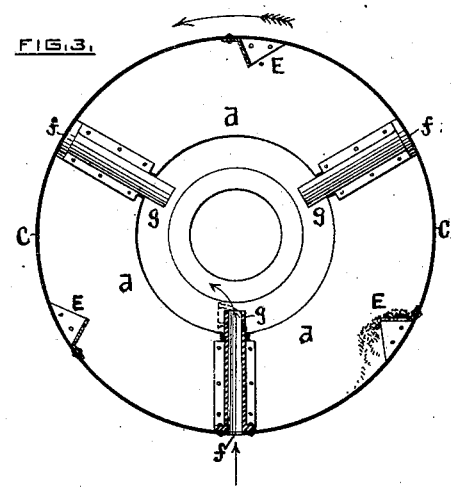
WITNESSES.
J. Knight
W. H. Thurston.
INVENTOR:
Andrew G. Smith

UNITED STATES PATENT OFFICE.

ANDREW G. SMITH, OF PROVIDENCE, RHODE ISLAND, ASSIGNOR TO THE INTERNATIONAL PAVEMENT COMPANY, OF HARTFORD, CONNECTICUT.

APPARATUS FOR HEATING AND DRYING.

SPECIFICATION forming part of Letters Patent No. 245,980, dated August 23, 1881.

Application filed May 31, 1881. (No model.)

*To all whom it may concern:*

Be it known that I, ANDREW G. SMITH, of the city and county of Providence, in the State of Rhode Island, have invented certain new and useful Improvements in Apparatus for Heating and Drying Material; and I do hereby declare that the following specification, taken in connection with the drawings making a part of the same, is a full, clear, and exact description thereof.

Figure 1 is a side elevation in partial section. Fig. 2 is an end view, partly in section, on the lines $x\ x$ and $y\ y$. Fig. 3 is a transverse section of drying-cylinder enlarged.

My improved machine is especially designed for heating and drying crushed limestone which is to be mixed with melted asphaltum in the formation of plastic compositions, to be subsequently molded and formed under pressure into blocks for street-pavements or other analogous purposes. The machine can, however, with advantage be employed for evaporating the moisture from any other material, or for the drying of cereals, sugars, &c.

The apparatus as a whole consists, generally, of a hopper into which a mass of crushed limestone or other material is placed; a screw-conveyer for conveying the material to the drying-cylinder; a drying-cylinder provided with mechanism for rotating it, and provided with a helical channel or guide from end to end along its interior surface, so that the limestone will by the rotation of the cylinder around its axis be conveyed through such cylinder; a furnace for heating air in a chamber, which chamber incloses the rotating cylinder; devices for enabling such heated air to enter the drying-cylinder and circulate through the same, absorbing the moisture driven off from the material; a flue communicating with the interior of the drying-cylinder; a chimney for carrying off the vapor-charged air, and a chute for enabling the dried stone or other material to be discharged from the drying-cylinder.

Referring to the drawings, A is a hopper, into which the material to be dried is supplied in any convenient way. The bottom of the hopper is contracted and communicates with the groove or channel of a screw-conveyer, B.
This conveyer is made to revolve by means of power applied to a pulley on its shaft $a$, or by any other convenient means, and being within the cylindrical case $b$, connecting the hopper with the drying-cylinder C, it follows that any material entering from the hopper into the spiral channel of the conveyer-screw will be forced by the revolution of the screw into the drying-cylinder. This device is very similar in principle to that used in flouring-mills for conveying meal received from the mill-spouts to the elevator, and for it any other variety of conveyer may be substituted.

The drying-cylinder C is inclosed by a casing of brick-work, C', or other proper material, so as to be within an air-chamber, H. It is to be revolved around its axis by suitable mechanism for rotating it, applied in any preferred way; and in order that the material to be dried may enter at one end into the cylinder, and the moisture driven off by heat be discharged at the other end of the cylinder, the journals $c\ c'$, attached to the heads of the cylinder, are made tubular, so as to make loose slip-joint connections with the cylindrical case $b$ of the conveyer at one end and with the discharge-pipe or chimney D at the other end, so that the case $b$ and the chimney D may remain stationary while the drying-cylinder revolves, but remains in connection with them. Suitable bearings, $c^2$, for these journals $c\ c'$ may be set in the end walls of the casing C'; but I prefer that the tubular bearings should rest on friction-rollers $c^3$, in which case $c^2$ may be simply loosely-fitting collars.

The interior surface of the drying-cylinder C is provided with a spiral channel, $d$, formed of a vertical plate of twelve inches in height, more or less, secured at one edge to the inner surface of the cylinder, and arranged in a spiral line from the receiving to the discharging end of the cylinder; and at intervals there may be placed across the spiral channel shelves or ledges E, Fig. 3, over which the material to be dried may be tumbled as the cylinder is revolved, so as to be better exposed to the heated air circulating through the cylinder. At the end of the spiral channel an opening is made through the shell of the drying-cylinder, which opening communicates with a chute, F, for discharging the material which has been dried. In place of setting the axis of the drying-cylinder in a horizontal plane and providing its interior surface with a spiral channel, the cylinder may be set with its axis in a plane inclined to the plane of the ground, and the spiral channel can then be dispensed with; but the arrangement shown is preferable.

The air in the chamber which surrounds the drying-cylinder is heated in any convenient or preferred way by a furnace, G, or by steam-pipes, to the requisite temperature. To admit this heated air into the cylinder, to afterward circulate through the same and take up and bear away the moisture driven off from the material undergoing drying, the shell of the drying-cylinder is perforated with a series of holes, $f$, from two to three feet apart, or thereabout, around its whole surface, and into these holes are inserted pipes $g$—say one inch in diameter—which extend radially inward toward the axis of the cylinder for a distance of from six to twelve inches beyond the walls of the spiral channel $d$, so that none of the material can escape out of the cylinder through such pipes. It will be found advisable in practice to stay these pipes by securing them by clasps and rivets to the walls of the channel.

The crushed limestone or other substance or material to be dried is, by the revolution of the drying-cylinder, made to travel through the spiral channel $d$ from the receiving to the discharging end of the cylinder, and being subjected to the influence of heat from the furnace, the moisture which it contains is driven off in the form of vapor. The heated air in the air-chamber surrounding the drying-cylinder flows into the cylinder through the entrance-pipes $g$ and absorbs this moisture, while the draft through the discharge-pipe D, which may be connected with the chimney of the furnace, not only causes the air from the air-chamber H to be drawn into the cylinder and circulate through it, but also carries off the same after it has become charged with vapor.

For drying some substances—as limestone, for example, for use in making paving-blocks—it will not be necessary to prevent the shell of the drying-cylinder from being exposed directly to the flames of the furnace, or to exclude all the smoke, gases, and products of combustion from the drying-cylinder. For drying some other substances—as cereals, for example—it is important that none of the products of combustion should find entrance to the drying-cylinder, and therefore, if the apparatus is to be used for drying any material which would be injured by smoke or gases, the air-chamber should have no direct communication with the furnace. A convenient arrangement in such case will be to make use of steam for heating the air-chamber conducted through lines of pipes laid along the walls of the chamber and leading from and returning to any suitable steam-generator.

In the apparatus described it is necessary that means should be provided for supplying air to the air-chamber, not only for the purpose of maintaining an inflowing current to the drying-cylinder, but also to enable at pleasure the temperature of the air within the drying-cylinder to be lowered in case from any cause the heat has become greater than is required for drying.

In drying crushed limestone for use in the manufacture of concrete composition for paving-blocks, if the stone becomes calcined from the effect of a too high degree of heat in the drying-cylinder, it will be greatly impaired in value as a constituent for such composition. Accordingly, to furnish a supply of air to the air-chamber to maintain a circulation within the drying-cylinder, and also incidentally to reduce the temperature within the cylinder, if desired, the air-chamber is provided with any preferred number of doors I, arranged at convenient intervals, in which doors, if preferred, register valve-openings may be made, whereby the outer air may be admitted into the air-chamber, and the heat within the drying-cylinder may be regulated.

What is claimed as the invention, and desired to be secured by Letters Patent, is—

1. The combination, substantially as above set forth, of a hopper for containing material to be dried, a conveyer for delivering the same to the revolving drying-cylinder, a revolving drying-cylinder constructed to receive the material and pass it through the cylinder, a discharge-chute to carry off the dried material, an air-chamber inclosing the drying-cylinder, inwardly-projecting pipes for enabling the air-chamber to communicate with the interior of the drying-cylinder, and a chimney for carrying off the vapors evolved from the material during drying.

2. The combination, substantially as above set forth, of a revolving drying-cylinder provided with a chimney, an air-chamber inclosing the cylinder, inwardly-projecting pipes connecting the interior of the cylinder with the air-chamber, and doors or apertures to admit the external air into the air-chamber to maintain an air-circulation within the drying-cylinder, and to enable the temperature within the cylinder to be regulated.

ANDREW G. SMITH.

Witnesses:
I. KNIGHT,
W. H. THURSTON.